United States Patent [19]

Arbuckle et al.

[11] Patent Number: 5,563,805
[45] Date of Patent: Oct. 8, 1996

[54] MULTIMEDIA CONTEXT-SENSITIVE REAL-TIME-HELP MECHANISM FOR USE IN A DATA PROCESSING SYSTEM

[75] Inventors: Thomas R. Arbuckle, Bedford; Marvin L. Williams, Lewisville, both of Tex.

[73] Assignee: International Business Machines Corporation, Armonk, N.Y.

[21] Appl. No.: 291,388

[22] Filed: Aug. 16, 1994
(Under 37 CFR 1.47)

[51] Int. Cl.⁶ .................................................. G06F 17/27
[52] U.S. Cl. .......................... 364/514 C; 395/200.04; 395/200.09; 395/200.12
[58] Field of Search ..................... 364/514 A, 514 B, 364/514 C, 514 R; 395/155, 157, 200.04, 200.09, 200.12

[56] References Cited

U.S. PATENT DOCUMENTS

| | | | |
|---|---|---|---|
| 5,103,498 | 4/1992 | Lanier et al. | 395/68 |
| 5,122,972 | 6/1992 | Richards et al. | 395/157 |
| 5,179,654 | 1/1993 | Richards et al. | 395/157 |
| 5,239,617 | 8/1993 | Gardner et al. | 395/12 |
| 5,255,386 | 10/1993 | Prager | 395/600 |
| 5,287,448 | 2/1994 | Nicol et al. | 395/159 |
| 5,310,349 | 5/1994 | Daniels et al. | 434/350 |
| 5,377,319 | 12/1994 | Kitahara et al. | 395/161 |
| 5,442,759 | 8/1995 | Chiang et al. | 395/375 |
| 5,477,447 | 12/1995 | Luciw et al. | 364/419.08 |

OTHER PUBLICATIONS

Lamberti et al. "Advice–Giving Using Reason: An Intelligent Assistant for Interactive Computing", Aug. 1991.

*Primary Examiner*—James P. Trammell
*Assistant Examiner*—Patrick J. Assouad
*Attorney, Agent, or Firm*—Edward H. Duffield; Duke W. Yee; Andrew J. Dillon

[57] ABSTRACT

A method and apparatus for providing assistance to a user in a distributed data processing system. The distributed data processing system includes a plurality of applications and has a multiple users enrolled therein, wherein a plurality of expert users are present within the multiple users enrolled in the data processing system. Each expert user within has an expertise in a selected area. One of the expert users is selected in response to a request for assistance by a user. The selection of the expert user is based on the context sensitive criteria. Next, a communications channel to the selected expert user is established to provide help to the user.

20 Claims, 5 Drawing Sheets

MULTIMEDIA CONTEXT-SENSITIVE REAL-TIME-HELP MECHANISM FOR USE IN A DATA PROCESSING SYSTEM

BACKGROUND OF THE INVENTION

1. Technical Field

The present invention relates generally to a method and system for transmitting information to a user of a distributed data processing system and in particular to a method and system for transmitting help information to a user of an application. Still more particularly, the present invention relates to a method and system for transmitting help information to a user on a distributed data processing system using a multimedia context-sensitive real-time-help mechanism.

2. Description of the Related Art

Computers are becoming increasingly ubiquitous in the modern world. The introduction of the so-called "personal" computer has greatly enhanced the availability of the computing power to many people. As these computers become more common-place, a greater number of applications for this computing power is available for users both at work and at home.

The applications currently available provide a variety of mechanisms to display help information to a user of the application. For example, a number of word processing applications provide help information in real time to the context that the user is using the application. For example, if a user in a word processing application is within the "block mode" of the application and requests help, then the application will display help information about the "block mode" function. Recently, some applications provide pre-recorded multimedia presentations that may be played upon a user requesting help from the application.

As applications become more complex, it becomes increasingly difficult to predefine all situations and contexts in which an application may be used. Often times, the problem may be occurring because of hardware characteristics or interference from other software applications, or a combination of both hardware and software configurations.

Current software vendors provide hot-lines and help-desk numbers by which a user may telephone and seek "expert" help regarding their particular problem with an application. Many times these help sessions result in a resolution of the problem for the particular user. Other users, however, are not privy to the techniques that were employed to resolve the problem. As a result, other users will often call the help-desk with the identical or similar problem.

Many of these help-desk services charge fees for their assistance. Consequently, inefficient use of a help-desk may occur when an "expert" provides help to a number of users for the same problem. In addition, often times the user does not see the keystrokes or the expert's screen during the help session. As a result, more time may be required to solve the problem because the expert has to describe the keystrokes and the resulting response from the application to the user. Therefore, it would be advantageous to have a method and apparatus for providing context sensitive real-time help to a user with respect to context-sensitive applications.

SUMMARY OF THE INVENTION

It is one object of the present invention to provide a method and system for transmitting information to a user of a distributed data processing system.

It is another object of the present invention to provide a method and system for transmitting help information to a user of an application in a distributed data processing system.

It is yet another object of the present invention to provide a method and system for transmitting help information to a user on a distributed data processing system using a multimedia context-sensitive real-time-help mechanism.

The present invention provides a method and apparatus for providing assistance to a user in a distributed data processing system. The distributed data processing system includes a plurality of applications and has multiple users enrolled therein, wherein a plurality of expert users are present within the multiple users enrolled in the data processing system. Each expert user within has an expertise in a selected area. One of the expert users is selected in response to a request for assistance by a user. The selection of the expert user is based on the context sensitive criteria. Next, a communications channel to the selected expert user is established to provide help to the user.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
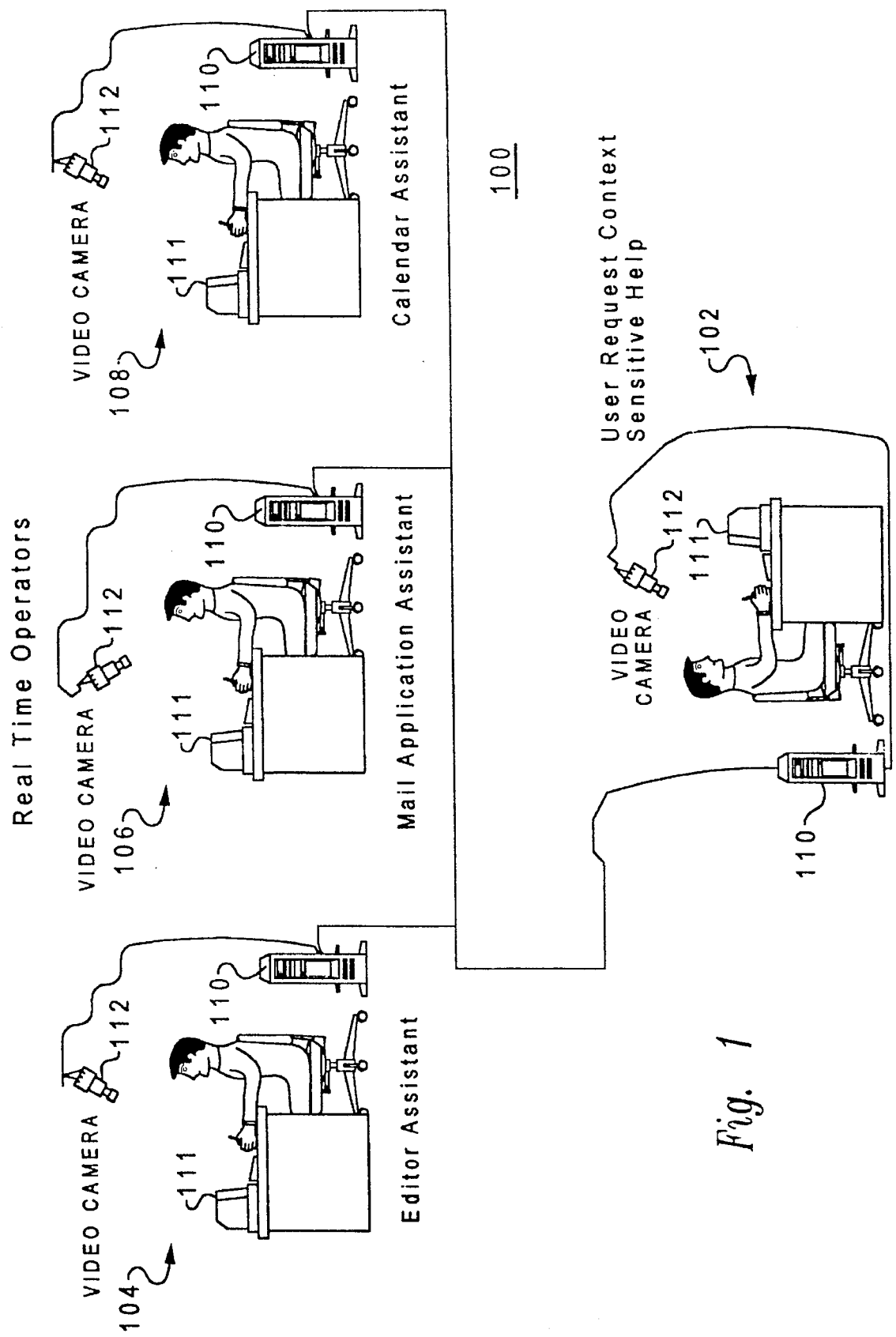
FIG. 1 depicts a distributed data processing system in which a user may request context-sensitive help in accordance with a preferred embodiment of the present invention.
Figure 2:
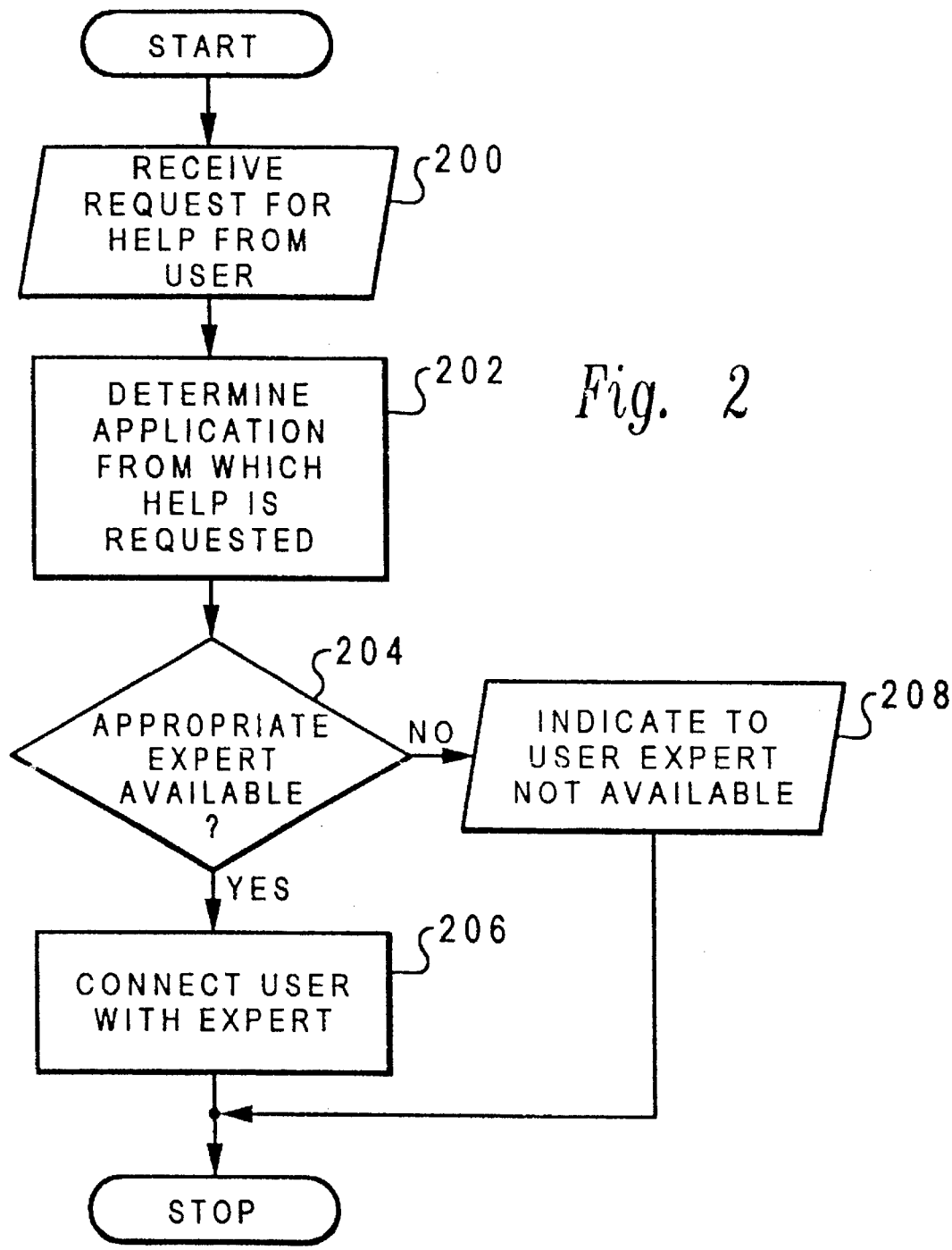
FIG. 2 is a flowchart of a process for routing help requests in a distributed data processing system in accordance with a preferred embodiment of the present invention.

With reference now to the figures and in particular with reference to FIG. 1, a distributed data processing system in which a user may request context-sensitive help is depicted in accordance with a preferred embodiment of the present invention. Distributed data processing system 100 includes work stations 102–108. Each work station includes a computer 110, which is connected to other computers 110 in distributing data processing system 100. Furthermore, in the depicted example, distributed data processing system 100 also includes a video camera 112 at each work station, which is connected to a computer 110. Each video camera 112 may record and transmit audio and video data although the depicted embodiment illustrates for work stations, other numbers of work stations may be employed with different numbers of users and expert users. Video cameras 112 may point at a number of objects such as the display, a document or a person.

A user at work station 102 using an application may press a help key to activate a context-sensitive help program that will recognize the software component being used and contact the "expert user" for that component. The method of contact may be via a local area network address, a telephone, or any other acceptable means of addressability. In distributed data processing system 100, existing live video, audio, and graphics display technology are employed to allow a user to view a live image of the expert user on the computer display 111. In addition, the expert user also is able to view the user during the conversation. An "expert user" may be a person or an artificial intelligence program in accordance with a preferred embodiment of the present invention.

In the depicted example in FIG. 1, an example of an office software application using the invention is illustrated. The distributed data processing system 100 includes expert users for editor, mail and calendar applications at work stations 104, 106, and 108, respectively. As a result, if a user at work station 102 requests help while in the context of one of these segments of the user's application, an automatic audio and video channel is established with the appropriate expert user. In accordance with the preferred embodiment of the present invention, both the user and the expert user are able to switch from live video to display graphic to, for example, illustrate the problem while the expert user watches it happen. The expert user also may illustrate the solution while the user views it on the display.

The processes depicted in FIGS. 2–6 are processes that employed in accordance with a preferred embodiment of the present invention to provide context sensitive help to a user. Referring now the FIG. 2, a flow chart of a process for routing help requests in distributed data processing system 100 is depicted in accordance with a preferred embodiment of the present invention. The process begins in response to receiving a request for help from a user as depicted in block 200. Thereafter, the process determines the application for which help has been requested, as illustrated in block 202. Thereafter, a determination of whether an expert user is available is made, as illustrated in block 204. This determination is made using contextual criteria in accordance with a preferred embodiment of the present invention. The term "context-sensitive" as used herein, means the application a user is utilizing and the place in the application from which the user is requesting help. "Contextual criteria" is criteria used to select the appropriate expert user to provide assistance to a user requesting help. For example, contextual criteria may include the application currently being manipulated by the user and the particular function that the user is employing when a request for assistance is made. If an,expert user is available, the process then connects the user and the expert user, as illustrated in block 206, with the process terminating thereafter. Referring again to block 204, if an expert user is unavailable, the process then sends a message to the user indicating that help is not available at this time, as illustrated in block 208. The process thereafter termites. Of course, the process could check for availability of an expert user periodically and alert the user when an expert user is available instead of merely indicating that an expert user is unavailable at the time.

Figure 3:
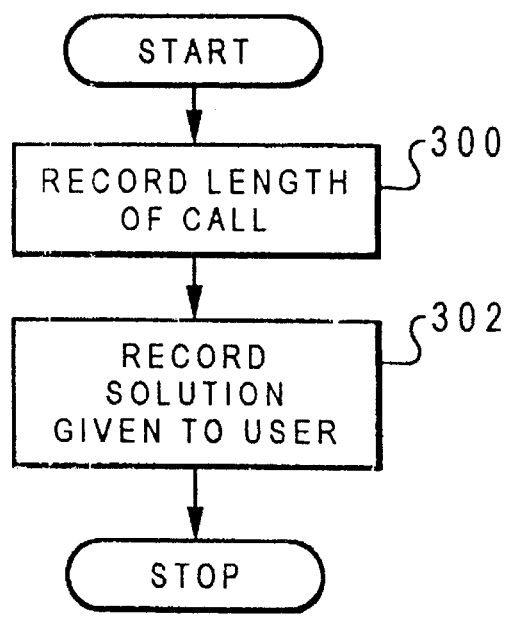
FIG. 3 depicts a flow chart of a process for allowing a user to store accounting information in accordance with a preferred embodiment of the present invention.

Referring now to FIG. 3, a flow chart of a process for allowing a user to store accounting information is depicted according to the present invention. In response to a user selecting an accounting option in the help system, the process records the length of the call, as illustrated in block 300 and records the billing code, as illustrated in block 302 for each caller. This information may be used for tracking, auditing, and billing help services.

Figure 4:
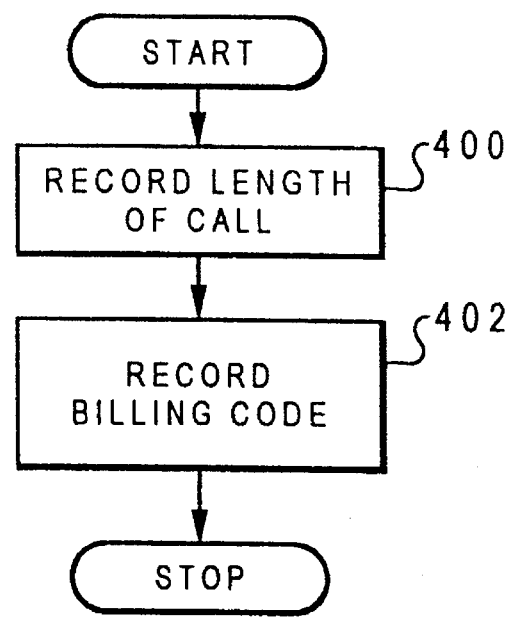
FIG. 4 is a flow chart of a process for recording survey information in accordance with a preferred embodiment of the present invention.

Referring now to FIG. 4, a flow chart of a process for recording survey information is depicted according to the present invention. In response to a selection of this option, the process stores the length of each call, as illustrated in block 400. The process also stores the solution given, as illustrated in block 402 with the process thereafter terminating. This information may be used to measure effectiveness and customer satisfaction.

Figure 5:
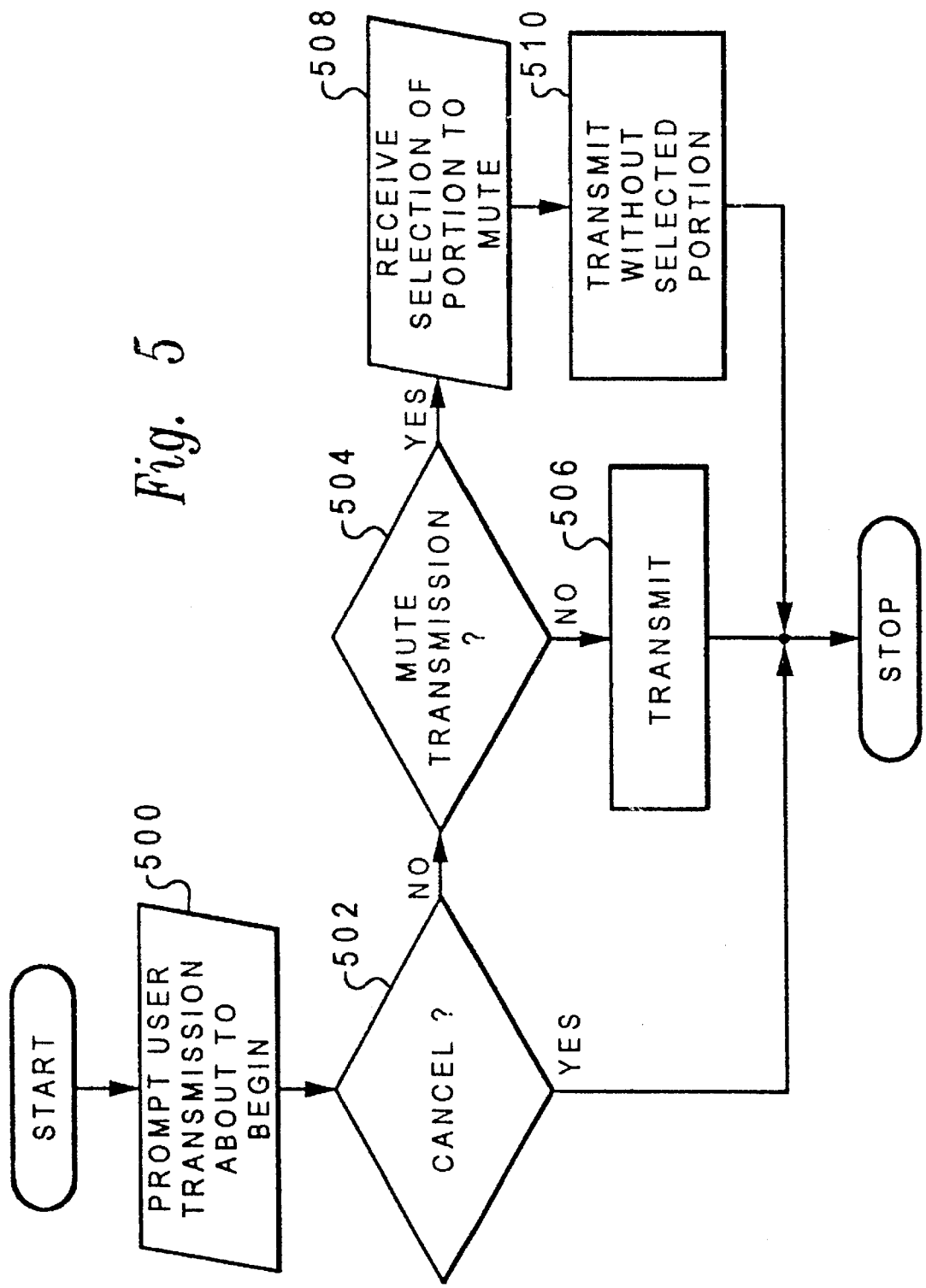
FIG. 5 depicts a flow chart of a process for maintaining security in accordance with a preferred embodiment of the present invention.

Referring now to FIG. 5, a flow chart of a process for maintaining security is illustrated in accordance with a preferred embodiment of the present invention. The process prompts the user that the display or live video is about to be transmitted, as illustrated in block 500. Thereafter, the process determines whether the user has elected to cancel the transmission, as depicted in block 502. If the user has elected to cancel the transmission, the process then terminates. If the user does not choose to terminate the transmission, the process then determines whether the user has decided to mute the transmission, as illustrated in block 504. If the user has not selected mute, the process then transmits the display or live audio or video, as depicted in block 506. Referring again to block 504, if the user has selected the mute option, the process then waits to receive a selection from the user indicating the portion of the transmission to be "muted", as illustrated in block 508. This function allows the ability to suspend video, audio, or graphics at any time with the use of a program button that is similar in function to a mute button on a telephone.

Upon receiving the user selection, the process then begins sending the transmission without the selected portion. As described above, both the user and the expert user are prompted and/or reminded when live video is active or an image of a user's display is about to be transmitted.

Figure 6:
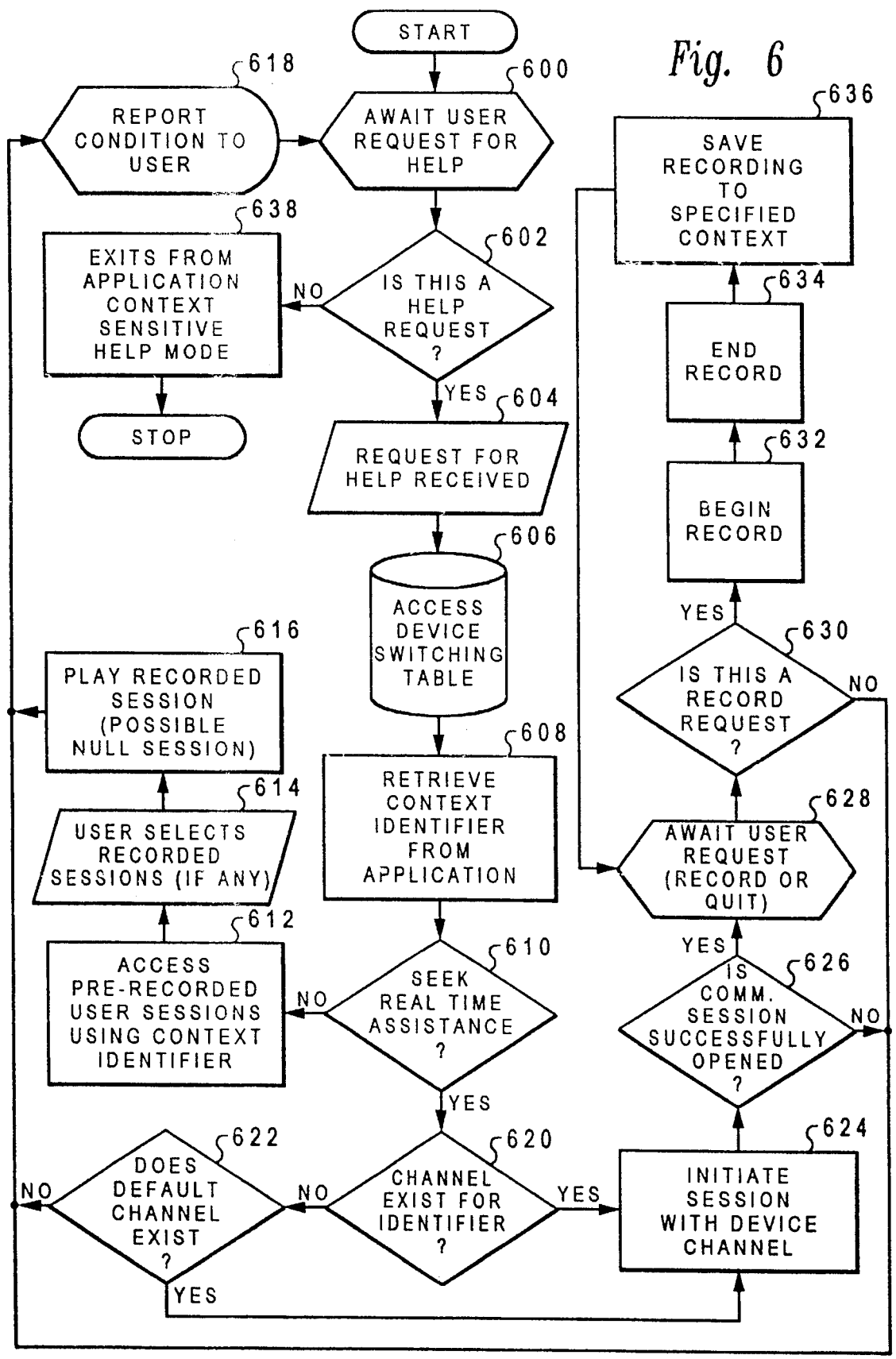
FIG. 6 is a flow chart of a process for providing context-sensitive real-time-help in accordance with a preferred embodiment of the present invention.

Referring now to FIG. 6, a flow chart of a process for providing context-sensitive real-time help is depicted in accordance with a preferred embodiment of the present invention. The process begins by awaiting a user request for help, as illustrated in block 600. Upon receiving a request for help, the process then determines whether the request is a help request, as depicted in block 602. If the request is a help request, the process then indicates that a request for help has been received, as illustrated in block 604. Thereafter, the request is used to access a device switching table, as depicted in block 606. A context identifier, also called "contextual criteria", from the application is retrieved, as illustrated in block 608. The process then determines whether the request seeks real time assistance, as depicted in block 610. If the request does not seek real-time assistance, the process then accesses pre-recorded user sessions using the context identifier, as illustrated in block 612. The process then allows the user to select recorded sessions if any were found for the context identifier, as depicted in block 614. The process then plays any recorded session selected by the user, as illustrated in block 616. A possible null session may occur during this step. For example, no recorded session may be available for display to the user. The process then proceeds to report the condition to the user, as depicted in block 618. Then, the process returns to block 680 to await for a request from the user.

Referring again to block 610, if the request seeks real-time assistance, the process then determines whether a channel exists for the context identifier, as illustrated in block 620. If a channel does not exist, the process then determines whether a default channel exists, as depicted in block 622. If no default channel exists, the process then returns to block 618 as described above. Referring again to block 620, if a channel does exist for the context identifier, the process then proceeds to initiate a session with the device channel, as illustrated in block 624. This step also is reached if a default channel exists in block 622. Thereafter, the process determines whether a communications session has been successfully opened, as depicted in block 626. If a communications session has not been opened, the process then returns to block 618 to report the condition to the user. A successful opening of a communications session results in the process awaiting a user request, as illustrated in block 628. The user request may take the form of a request to record or to quit in accordance with a preferred embodiment of the present invention. Upon receiving a user request, the process then determines whether the request is a record request, as illustrated in block 630. If the request is not a record request, the process then reports the condition to the user as described before in block 618. A record request results in the process beginning to record the session, as illustrated in block 632. The process terminates recording at the end of the session, as depicted in block 634. Thereafter, the recording is saved to a specified context, as illustrated in block 636. The process then returns to block 628 to wait for another user request.

Referring again to block 602, if the process determines that the request is not a help request, the process then exits from the application context sensitive help mode as illustrated in block 638 with the process terminating thereafter.

While the invention has been particularly shown and described with reference to a preferred embodiment, it will be understood by those skilled in the art that various changes in form and detail may be made therein without departing from the spirit and scope of the invention.

We claim:

1. A method in a distributed data processing system for providing assistance to a user on said distributed data processing system, wherein said data processing system includes a plurality of applications and has a multiple users enrolled therein, wherein a plurality of expert users,are present within said multiple users, each expert user within said plurality of expert users having an expertise in a selected area, said method comprising:

selecting one of said plurality of expert users in response to a request for assistance by a user, wherein said selection of said one of said plurality of expert users is based on contextual criteria; and establishing a communications channel to said selected one of said plurality of expert users, wherein the communication channel includes a plurality of different types of media.

2. A method in a distributed data processing system for providing assistance to a user in said distributed data processing system, wherein said data processing system includes a plurality of applications and has a multiple users enrolled therein, wherein a plurality of expert users are present within said multiple users, each expert user within said plurality of expert users having an expertise in a selected area, said method comprising:

selecting one of said plurality of expert users in response to a request for assistance by a user, wherein said selection of said one of said plurality of expert users is based on contextual criteria; and establishing a communications channel to said selected one of said plurality of expert users, wherein said step of establishing a communications channel includes allowing graphic data from a station associated with said selected one of said plurality of expert users to be displayed at a station associated with said user 3. A method in a distributed data processing system for providing assistance to a user in said distributed data processing system, wherein said data processing system includes a plurality of applications and has a multiple users enrolled therein, wherein a plurality of expert users are present within said multiple users, each expert user within said plurality of expert users having an expertise in a selected area, said method comprising:

selecting one of said plurality of expert users in response to a request for assistance by a user, wherein said selection of said one of said plurality of expert users is based on contextual criteria; and establishing a communications channel to said selected one of said plurality of expert users, wherein said step of establishing a communications channel includes establishing an audio channel and a video channel between said user and said selected one of said plurality of expert users.

4. The method of claim 3, wherein said step of establishing a communications channel includes allowing graphic data from a station associated with said selected one of said plurality of expert users to be displayed at a station associated with said user.

5. A method in a distributed data processing system for providing assistance to a user in said distributed data processing system, wherein said data processing system includes a plurality of applications and has a multiple users enrolled therein, wherein a plurality of expert users are present within said multiple users, each expert user within said plurality of expert users having an expertise in a selected area, said method comprising:

selecting one of said plurality of expert users in response to a request for assistance by a user, wherein said selection of said one of said plurality of expert users is based on contextual criteria;

establishing a communications channel to said selected one of said plurality of expert users; and recording a session between a first user and an expert user from within said plurality of users.

6. The method of claim 5, further comprising replaying said recorded session in response to a second user requesting assistance in which said context sensitive criteria used to select said expert user and record said session matches said context sensitive criteria present for said second user requesting assistance.

7. A distributed data processing system for providing assistance to a user in said distributed data processing system, wherein said distributed data processing system includes a plurality of applications and has a multiple users enrolled therein, wherein a plurality of expert users are present within said multiple users, each expert user within said plurality of expert users having an expertise in a selected area, said data processing system comprising:

selection means for selecting one of said plurality of expert users in response to a request for assistance by a user, wherein said selection of one of said plurality of expert users is based on contextual criteria; and establishment means for establishing a multimedia communications channel to said selected one of said plurality of expert users.

8. A distributed data processing system for providing assistance to a user in said distributed data processing system, wherein said distributed data processing system includes a plurality of applications and has a multiple users enrolled therein, wherein a plurality of expert users are present within said multiple users, each expert user within said plurality of expert users having an expertise in a selected area, said data processing system comprising:

selection means for selecting one of said plurality of expert users in response to a request for assistance by a user, wherein said selection of one of said plurality of expert users is based on contextual criteria; and establishment means for establishing a multimedia communications channel to said selected one of said plurality of expert users, wherein said establishment means includes means for allowing graphic data from a station associated with said selected one of said plurality of expert users to be displayed at a station associated with said user.

9. A distributed data processing system for providing assistance to a user in said distributed data processing system, wherein said distributed data processing system includes a plurality of applications and has a multiple users enrolled therein, wherein a plurality of expert users are present within said multiple users, each expert user within said plurality of expert users having an expertise in a selected area, said data processing system comprising:

selection means for selecting one of said plurality of expert users in response to a request for assistance by a user, wherein said selection of one of said plurality of expert users is based on contextual criteria; and establishment means for establishing a multimedia communications channel to said selected one of said plurality of expert users, wherein said establishment means includes means for establishing an audio channel, a data channel for graphic data, and a video channel between said user and said selected one of said plurality of expert users.

10. The distributed data processing system of claim 9, wherein said establishment means includes allowing means for graphic data from a station associated with said selected one of said plurality of expert users to be displayed at a station associated with said user.

11. A distributed data processing system for providing assistance to a user in said distributed data processing system, wherein said distributed data processing system includes a plurality of applications and has a multiple users enrolled therein, wherein a plurality of expert users are present within said multiple users, each expert user within said plurality of expert users having an expertise in a selected area, said data processing system comprising:

selection means for selecting one of said plurality of expert users in response to a request for assistance by a user, wherein said selection of one of said plurality of expert users is based on contextual criteria;

establishment means for establishing a multimedia communications channel to said selected one of said plurality of expert users; and recording means for recording a session between a first user and an expert user from within said plurality of users.

12. The distributed data processing system of claim 11, further comprising transmission means for replaying said recorded session in response to a second user requesting assistance in which said context sensitive criteria used to select said expert user and record said session matches said context sensitive criteria present for said second user requesting assistance.

13. The distributed data processing system of claim 10, further comprising security means for selectively preventing use of a portion of communications channel between said user and said selected one of said plurality of expert users.

14. The distributed data processing system of claim 13, wherein said audio channel is said selected portion of said communications channel in which use is prevented.

15. The distributed data processing system of claim 13, wherein said video channel is said selected portion of said communications channel in which us is prevented.

16. The distributed data processing system of claim 13, wherein said data channel is said selected portion of said communications channel in which use is prevented.

17. The distributed data processing system of claim 7, wherein said contextual criteria includes an application from which said user is requesting help.

18. The distributed data processing system of claim 17, wherein said contextual criteria further includes a particular function said user is employing in said application.

19. The method of claim 1, wherein the step of establishing a communications channel comprises establishing a communication channel to said selected one of said plurality of expert users, wherein said communications channel includes a plurality of media, including an audio channel and a video channel.

20. The distributed data processing system of claim 7, wherein the multimedia communications channel includes an audio channel and a video channel.

* * * * *

UNITED STATES PATENT AND TRADEMARK OFFICE
CERTIFICATE OF CORRECTION

PATENT NO. : 5,563,805
DATED : October 8, 1996
INVENTOR(S) : Arbuckle et al.

It is certified that error appears in the above-indentified patent and that said Letters Patent is hereby corrected as shown below:

Column 4, line 64: change "680" to --600--

Signed and Sealed this

Seventh Day of January, 1997

Attest:

BRUCE LEHMAN

*Attesting Officer*     *Commissioner of Patents and Trademarks*